Oct. 7, 1969  NAOYUKI UNO  3,470,807
CAMERA THROUGH THE LENS LIGHT MEASURING SYSTEM
Filed March 7, 1967
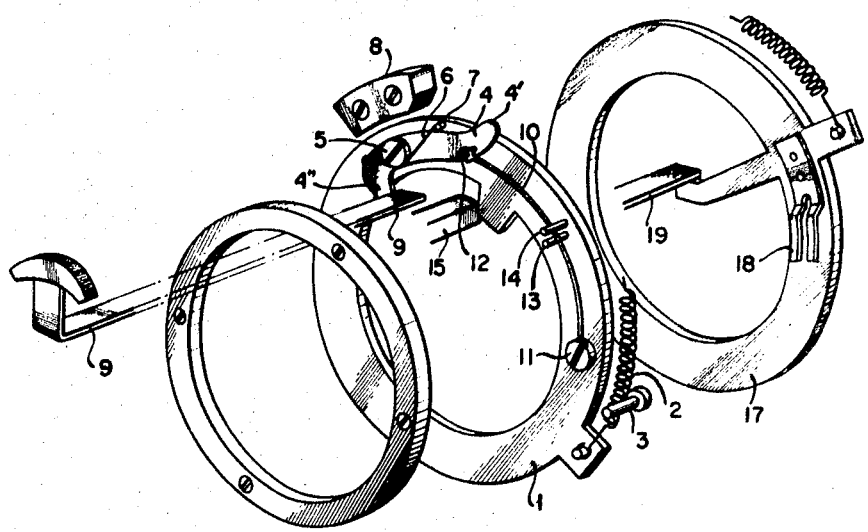
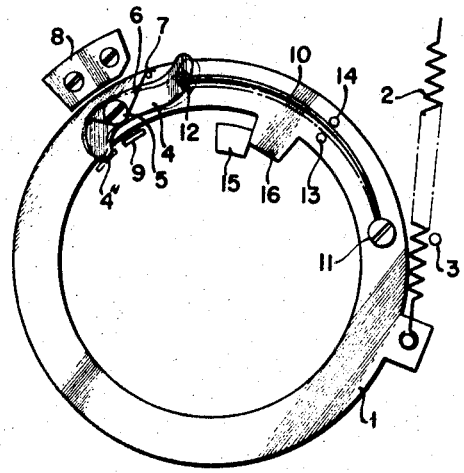 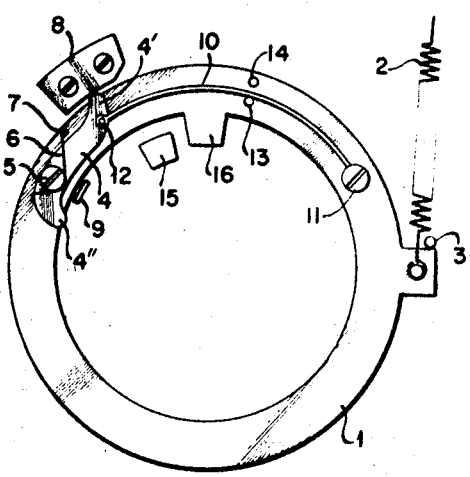
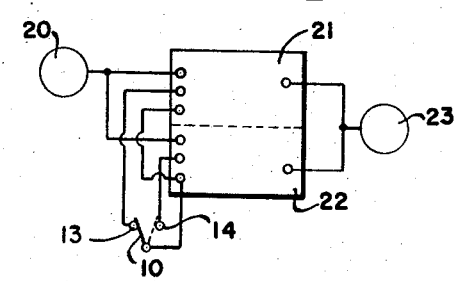
INVENTOR
NAOYUKI UNO
BY Stanley Wolder
ATTORNEY United States Patent Office 3,470,807
Patented Oct. 7, 1969

3,470,807
CAMERA THROUGH THE LENS LIGHT MEASURING SYSTEM
Naoyuki Uno, Urawa-shi, Japan, assignor to Asahi Kogaku Kogyo Kabushiki Kaisha, Tokyo-to, Japan, a corporation of Japan
Filed Mar. 7, 1967, Ser. No. 621,233
Claims priority, application Japan, Mar. 16, 1966, 41/15,756
Int. Cl. G03b 3/00
U.S. Cl. 95—44                     6 Claims

ABSTRACT OF THE DISCLOSURE

In an interchangeable objective camera with a through the lens light measuring system a pair of circuits are provided for measuring the light through an open automatic diaphragm and through a manually adjustable diaphragm respectively. A switch is mounted on the camera for alternatively actuating the circuits and in turn is actuated by the coupling of an objective to the camera so that depending on the type of objective diaphragm control a corresponding circuit is actuated. Manually operated means are provided for selectively actuating the light measuring circuits.

BACKGROUND OF THE INVENTION

The present invention relates generally to improvements in interchangeable objective cameras provided with light measuring systems and it relates particularly to an improved through the lens measuring system in an interchangeable objective camera wherein a proper light measurement is assured both with a fully open automatic diaphragm and a stopped down manually adjustable diaphragm. The system of the present invention is advantageously employed in single lens reflex cameras having a through the lens, or internal light measuring arrangement, and provided with interchangeable objectives which may be of the automatic or manually adjustable diaphragm type.

In a camera provided with an objective having an automatic diaphragm arrangement which effects a proper diaphragm value automatically and instantly at the moment of photographing in response to the light measurement value of an internal light receiving exposure meter, it is conventional that the light measurement is performed with the objective diaphragm fully open so that the proper diaphragm value corresponding to the predetermined shutter speed is obtained with the fully open diaphragm, and then, upon depression of the shutter rod said measured light value is automatically transmitted to the diaphragm so as to adjust the openings thereof. In employing a single lens reflex camera the diaphragm is frequently manually stopped down for viewing and determining the depth of focus. On such occasion if the user inadvertently performs the photographing operation with the diaphragm remaining stopped down, then an overexposure will result.

In cameras whose objective is interchangeable by means of a screw mount or coupling arrangement, the interchanged objective barrel is not necessarily uniformly screwed to the camera body at the required precise position, as described in Japanese patent application No. 1965/50119 corresponding to copending U.S. patent application Ser. No. 567,178, filed July 22, 1966. This necessitates an arrangement for compensating such screwed-in position error. Precise light measurement is assured by properly compensating such screwed-in position error through an electric resistor member.

SUMMARY OF THE INVENTION

A principal object of the present invention is to provide an improved camera internal light measuring system.

Another object of the present invention is to provide an improved interchangeable objective camera internal light measuring system.

Still another object of the present invention is to provide an improved camera internal light measuring system which automatically properly operates under different diaphragm control procedures.

A further object of the present invention is to provide an improved camera internal light measuring system which automatically properly operates under automatic diaphragm and manually adjustable diaphragm conditions and in which such alternative operational modes may be selectively actuated.

The above and other objects of the present invention will become apparent from a reading of the following description taken in conjunction with the accompanying drawing.

In a sense the present inventon contemplates the provision of a camera provided with a separably coupled objective, an internal light measuring system including a plurality of light measuring circuits, and means responsive to the coupled condition of said objective for alternatively actuating said light measuring circuits. Advantageously the light measuring system includes a first circuit for measuring the light for automatic diaphragm control with the diaphragm fully open and a second circuit for measuring the light with the diaphragm in a manually adjusted or stopped down condition. The alternative circuit actuating means includes a switch associated with the two circuits and normally in a condition actuating the first circuit, the switch being advanced to actuate the second circuit by an element which is carried by the objective barrels and which acts on the switch through a camera mounted motivating mechanism. Means are provided for selectively returning the switch to the first circuit actuation condition when the objective barrel is in a coupled position.

BRIEF DESCRIPTION OF THE DRAWINGS

FIGURE 1 is an exploded perspective of a mechanism embodying the present invention;

FIGURE 2 is a front elevational view thereof illustrated in one operational mode;

FIGURE 3 is a view similar to FIGURE 2 illustrated in another operational mode; and FIGURE 4 is a schematic view of the associated light measuring network.

DESCRIPTION OF THE PREFERRED EMBODIMENT

Referring now to the drawing which illustrates a preferred embodiment of the present invention the reference numeral 1 generally designates an operative ring formed of an electrically insulating material which is urged counterclockwise, as viewed in the drawing, by a tension spring 2, such counterclockwise movement being limited by a stationary stop member 2 positioned in the path of a radial arm on the ring 1. A lever 4 is pivoted between its ends to the ring 1 by a screw pin 5 and is urged counterclockwise about the pin 5 by a spring 6. A stop 7 is positioned on the ring 1 to limit the counterclockwise movement of the lever 4. An abutment member or tripping element 8 with a cammed leading end is fixed to the camera casing and is positioned in the path of and opposed to an outwardly angularly projecting portion 4' of the lever 4. The opposite end of the lever 4 is provided with an inwardly hooked end portion 4" which is opposite to a change-over lever 9 arranged on the associated camera objective barrel. A switch arm defining resilient wire 10 has one end thereof secured by a screw 11 to the ring 1 and the other end thereof pivoted to a pin 12 positioned on the lever 4 adjacent to the portion 4', a pair of contacts 13 and 14 being positioned on opposite sides of the wire 10 between the ends thereof.

When the radial arm on the ring 1 abuts the stop 3 due to the action of the spring 2, as shown in FIG. 3, the lever 4 is in its clockwise position owing to the action of the abutment member 8 which bears on the lever portion 4' so that the wire 10 engages the contact 13, thereby establishing or actuating the stopped-down or manually adjusted diaphragm circuit. When owing to screwing-in or coupling of an interchangeable objective to the camera objective mount, a compensating projection 15 provided on the interchangeable objective barrel rotates the ring 1 clockwise through engagement with an inward projection 16 on the ring 1 (FIG. 2), to carry the lever 4 from engagement with the abutment 8 whereby to release the lever 4 to return the switch arm 10 into engagement with the contact 14, thereby establishing the fully open diaphragm circuit. The compensating projection 15 is dimensioned and positioned to engage the projection 16 during the last full turn of the screwed-in objective barrel.

The manual diaphragm ring of the objective barrel is provided with an engaging member 19. When an adjusting ring 17 is turned with a sliding contact member 18 contacting an electrical resistor member provided on the opposing surface of the ring 1, the stopped-down diaphragm circuit is established.

The compensating projection 15 is so arranged that, when the objective barrel is screwed in, with due consideration to screwing-in error of the user, during the last full turn of the screwing-in movement the compensating projection 15 engages the projection 16 and rotates the ring 1 by such angle that at least the end portion 4' of the lever 4 of the ring 1 is disengaged from the abutment member 8 (from the state of FIG. 3 to that of FIG. 2).

A photosensitive element such as photoconductor 20, for example a cadmium sulphide cell, is positioned in the known manner in the path of the light from an object passing through the camera objective and diaphragm and is coupled to a pair of circuit networks 21 and 22 which may have common components and current source and whose outputs are connected to an electric responsive device 23 such as a meter or meter armature actuated diaphragm control. The contact 13 and switch arm 10 are coupled to the network 21 and the contact 14 and the switch arm 10 are coupled to the network 22 so that engagement by the switch arm 10 of a contact 13 or 14 closes the corresponding circuit and actuates a respective network 21 and 22 and the associated photoconductor 20 and electric device 23. The circuit, including the network 21 is of the nature employed in the measuring of through the lens light of a manually adjustable daiphragm system and the circuit including the network 22 is of the nature employed in the measuring of through the lens light through a fully open diaphragm, both networks being well known in the art.

Upon screwing-in or coupling of the objective barrel to the camera objective mount, the compensating projection 15 of the objective barrel rotates the ring 1 clockwise against the action of the spring 2 so that the lever 4 is disengaged from the abutment member 8 and is swung counterclockwise about the pivot 5 owing to the action of the spring 6 so that the resilient wire 10 is pushed up and engages the contact 14, thus actuating the circuit 22 and establishing the fully open diaphragm circuit.

When the change-over lever 9 is moved counterclockwise as viewed in the drawing, the lever 4 is swung clockwise as shown in dot-and-dash lines in FIG. 2 so that the resilient wire 10 engages the contact 13, thereby actuating the circuit 21 establishing the stopped-down diaphragm circuit.

Thus, according to the present invention, the stopped-down circuit is normally established, the screwing-in operation of an objective barrel having an automatic diaphragm automatically establishes the fully open diaphragm circuit, and, if necessary, change-over to the stopped-down diaphragm circuit may be carried out by operating the change-over lever 9. Further, with telephoto objectives, close range objectives, microscopic objectives, etc., there is always established the stopped-down circuit so that the user can always carry out the correct operation. With the change-over lever 9 coupled to the manual diaphragm ring, correct photographing operation can be always performed.

While there has been described and illustrated a preferred embodiment of the present invention, it is apparent that numerous alterations, omissions and additions may be made without departing from the spirit thereof.

I claim:

1. In a camera provided with a separably coupled objective, an internal light measuring system including first and second light measuring circuits, and a switch normally actuating said first circuit and responsive to the coupled condition of said objective for alternatively actuating said second circuit.

2. The camera of claim 1 wherein said switch includes a first contact coupled to said first circuit, an opposite second contact coupled to said second circuit and a switch arm alternatively engaging said contacts and responsive to the coupled condition of said objective.

3. In a camera provided with a separably coupled objective, an internal light measuring system including first and second light measuring circuits, means responsive to the coupled condition of said objective for alternatively actuating said second circuit, and manually operative means for selectively actuating said first circuit and deactuating said second circuit when said objective is in said second circuit actuating coupled condition.

4. In a camera provided with a separably coupled objective, an internal light measuring system including a plurality of light measuring circuits, and means responsive to the coupled condition of said objective for alternatively actuating said light measuring circuits, said circuit actuating means comprising a ring rotatably mounted on said camera coaxial with said objective for rotation between an advanced and a retracted position, a tripping element located adjacent said ring, a switch connected to said circuits, a switch actuating arm mounted on said ring and alternatively movable with said ring into and out of operational engagement with said tripping element for advancing and releasing said arm respectively, and means carried by said objective for rotating said ring with the turning of said objective attendant to the coupling thereof.

5. The camera of claim 4 including spring means normally urging said ring to a retracted position with said switch actuating arm engaging and being advanced by said tripping element, said ring being advanced with the rotation of said objective to a coupled position.

6. The camera of claim 4 including spring means normally urging said ring to a retracted position with said switch actuating arm engaging and being advanced by said tripping element, said ring being advanced with the rotation of said objective to a coupled position and means for selectively advancing said switch arm when said ring is in an advanced position.

References Cited

UNITED STATES PATENTS 2,031,321    2/1936    Kuppenbender _____ 95—10
3,163,097    12/1964    Zenyoji et al. _____ 95—42 XR NORTON ANSHER, Primary Examiner RICHARD L. MOSES, Assistant Examiner U.S. Cl. X.R.

95—10, 42, 64